United States Patent [19]
Auge et al.

[11] 3,906,011
[45] Sept. 16, 1975

[54] PROCESS FOR THE PREPARATION OF 1,5- AND 1,8-DINITROANTHRAQUINONE

[75] Inventors: Wolfgang Auge, Odenthal; Karl-Werner Thiem, Cologne; Rutger Neeff, Leverkusen, all of Germany

[73] Assignee: Bayer Aktiengesellschaft, Leverkusen, Germany

[22] Filed: Feb. 8, 1974

[21] Appl. No.: 440,829

[30] Foreign Application Priority Data
Feb. 10, 1973 Germany............................ 2306611

[52] U.S. Cl. ............................................... 260/369
[51] Int. Cl.² ........................................ C07C 79/37
[58] Field of Search ..................................... 260/369

[56] References Cited
UNITED STATES PATENTS
1,856,231  5/1932  Stowell .............................. 260/369
3,818,052  6/1974  Hohmann et al. .................. 260/369

FOREIGN PATENTS OR APPLICATIONS
52,206  1/1967  Poland ............................... 260/369

OTHER PUBLICATIONS
Hefti, Helv. Chem. Acta, 14, 1404–1427, (1931).

Primary Examiner—Anton H. Sutto
Assistant Examiner—E. Jane Skelly
Attorney, Agent, or Firm—Plumley & Tyner

[57] ABSTRACT

Preparation of 1,5- and/or 1,8-dinitroanthraquinone, characterised in that 1,5-dinitroanthraquinone is directly precipitated from the anthraquinone nitration mixtures by a adjusting the molar fraction of nitric acid to a value of $\gamma_{HNO_3} = 0.90$ to 0.68 at molar ratios of nitric acid:dinitroanthraquinone of 10:1 to 80:1; 1,8-dinitroanthraquinone is then precipitated from the filtrate by adjusting the molar fraction of nitric acid to a value of $\gamma_{HNO_3} = 0.80$ to 0.50 at molar ratios of nitric acid:dinitroanthraquinone of 10:1 to 80:1.

8 Claims, No Drawings

3,906,011

PROCESS FOR THE PREPARATION OF 1,5- AND 1,8-DINITROANTHRAQUINONE

The complete nitration of anthraquinone to dinitroanthraquinones in sulphuric acid by means of nitric acid (Hefti; Helv. 14, 1404 (31)) and in pure nitric acid (Boettger, Petersen, Ann. 160, 147) gives mixtures of dinitroanthraquinones which consist essentially of 1,5-, 1,8-, 1,6- and 1,7-dinitroanthraquinones. The 1,5- and 1,8-dinitroanthraquinones are important intermediate products in the preparation of dyestuffs (Colour Index 65,405, 65,415, 69,015 and 70,510). However, it is a prerequisite that the substances must be as free as possible of 1,6- and 1,7-dinitroanthraquinones.

There has therefore been no lack of attempts to isolate 1,5- and 1,8-dinitroanthraquinone which is as pure as possible from the dinitroanthraquinone mixtures which arise on complete nitration of anthraquinone.

For these purposes, the dinitroanthraquinones were precipitated from the corresponding reaction medium by addition of water, dried and recrystallized from organic solvents such as alcohol, glacial acetic acid, acetone and nitrobenzene (German Patent Specifications 167,699 and 72,685, Hefti, Helv. 14, 1404 (1931), Römer, Ber. 16, 365).

Furthermore, it is possible to isolate 1,5- and 1,8-dinitroanthraquinone from dinitroanthraquinone mixtures by separating these prducts from the reaction mixture and heating them for 2 to 4 hours in aqueous sodium sulphite solution. In the course thereof, 1,6- and 1,7-dinitroanthraquinone dissolve in the form of undefined compounds (U.S. Pat. No. 2,309,708). Admittedly, a further separation of the 1,5- and 1,8-dinitroanthraquinone mixture cannot be achieved by this process.

Polish Patent Specification 52,206 describes a process in which anthraquinone is nitrated in hydrofluoric acid, and the dinitroanthraquinones are separated off and thoroughly stirred with concentrated nitric acid at 50°C. Hereupon, all the material except for 1,5-dinitroanthraquinone dissolves. After separating off the 1,5-dinitroanthraquinone, 1,8-dinitroanthraquinone is precipitated by adding glacial acetic acid to the filtrate, whilst 1,6- and 1,7-dinitroanthraquinone remain in solution.

A disadvantage of particularly this process is that the nitric acid/glacial acetic acid mixtures are somewhat dangerous and that industrially they are difficult to handle.

A further possibility of separating dinitroanthraquinone mixtures into the individual components is to introduce the previously isolated mixture into a 20-fold quantity of sulphuric acid (100 percent strength) at 120° to 125°C, filter off the 1,5-dinitroanthraquinone which has remained undissolved at room temperature and then fractionally precipitate the 1,8-dinitroanthraquinone by cautious addition of ice, and separate it off. If the nitration of anthraquinone is carried out in sulphuric acid with nitric acid, separation into the individual components by means of the process just described is only possible if the entire reaction product or a fraction heavily enriched in 1,5- and 1,8-dinitroanthraquinone is first isolated (Hefti, Helv. 14, 1404).

All known processes have the disadvantage that the dinitroanthraquinone mixtures must be precipitated from the reaction medium, washed, dried and subjected to a separate purification operation. To this is added the fact that the recrystallisation or reprecipitation from another solvent is an expensive additional process step.

It has now been found, surprisingly, that almost pure 1,5- and 1,8-dinitroanthraquinone, which is practically free of 1,6- and 1,7-dinitroanthraquinone, can be separated directly from the nitration medium without first having to separate off, isolate and recrystallise the dinitroanthraquinone mixture.

The process according to the invention is characterised in that anthraquinone and/or 1-nitroanthraquinone or anthraquinone nitration mixtures which contain one or both of these components are nitrated in highly concentrated nitric acid ($\geq$ 90 percent) preferably in nitric acid of at least 92 percent strength, especially at a molar ratio of nitric acid:nitratable products of at least 12:1, and preferably 20:1 to 80:1, at temperatures between 0°C and the boiling point of nitric acid, to give dinitroanthraquinone, and thereafter the molar fraction of the nitric acid[+] is adjusted, at molar ratios of nitric acid:dinitroanthraquinone from 10:1 to 80:1, to a value of $\gamma_{HNO_3} = 0.90$ to $0.68$, the precipitate predominantly containing 1,5-dinitroanthraquinone is separated off according to customary methods, the molar fraction of the nitric acid in the filtrate is then adjusted, at molar ratios of nitric acid to as yet dissolved dinitroanthraquinones of 10:1 to 80:1, to a value of $\gamma_{HNO_3} = 0.80$ to $0.50$ and the precipitate containing predominantly 1,8-dinitroanthraquinone is separated off in the customary manner.

[+] In the text which follows, molar fraction is always to be understood as the molar fraction of nitric acid in the particular total mixture, in accordance with the following equation: $\gamma_{HNO_3} = n_{HNO_3}/(n_{HNO_2} + n_N + n_{H_2O})$ n = number of mols
N = sum of the dinitroanthraquinones.

If the molar fraction of the nitric acid is adjusted, after the end of the reaction, at molar ratios of nitric acid: dinitroanthraquinones of 10:1 to 80:1, to a value of $\gamma_{HNO_3} = 0.80$ to $0.50$, 1,5- and 1,8-dinitroanthraquinone can be precipitated conjointly and separated from the mother liquor containing the 1,6- and 1,7-dinitroanthraquinone. The molar fraction can be adjusted by distilling off nitric acid and/or by adding water and/or by adding dilute nitric acid, in optional sequence.

Accordingly, the subject of the invention is a process for the preparation of 1,5- and/or 1,8-dinitroanthraquinone which is practically free of 1,6- and 1,7-dinitroanthraquinone, characterised in that anthraquinone and/or 1-nitroanthraquinone or anthraquinone nitration mixtures which contain one or both of these components are nitrated in highly concentrated nitric acid, preferably at least 92 percent strength nitric acid, and preferably at a molar ratio of nitric acid:nitratable products of at least 12:1, especially of 20:1 to 80:1, at temperatures from 0°C to the boiling point of nitric acid, to give dinitroanthraquinones, and thereafter 1,5-dinitroanthraquinone is precipitated direct from the reaction mixture by adjusting the nitric acid molar fraction to a value of $\gamma_{HNO_3} = 0.90$ to $0.68$ at molar ratios of nitric acid:dinitroanthraquinone of 10:1 to 80:1, and is isolated in the customary manner, 1,8-dinitroanthraquinone is then precipitated from the filtrate by adjusting the nitric acid molar fraction to a value of $\gamma_{HNO_3} = 0.80$ to $0.50$ at molar ratios of nitric acid: dissolved dinitroanthraquinones of 10:1 to 80:1, and is isolated in the customary manner, or 1,5- and 1,8-dinitroanthraquinone are precipitated together directly after the nitration by adjusting the nitric acid molar fraction to a value of $\gamma_{HNO_3} = 0.80$ to 0.50 at molar ratios of nitric acid: dinitroanthraquinones of 10:1 to 80:1, and are isolated in the usual manner.

A further subject of the present invention is a process for isolating 1,5- and/or 1,8-dinitroanthraquinone from dinitroanthraquinone mixtures which consist essentially of 1,5-, 1,8-, -, 1,6-, - and 1,7-dinitroanthraquinone which is characterised in that the dinitroanthraquinone mixtures are first treated with nitric acid in a molar ratio of nitric acid to dinitroanthraquinone of about 10:1 to 80:1, the molar fraction of nitric acid having a value of $\gamma_{HNO_3} = 0.90$ to 0.68, the undissolved 1,5-dinitroanthraquinone is separated off and isolated in the usual manner and thereafter 1,8-dinitroanthraquinone is precipitated from the filtrate by adjusting the molar fraction of nitric acid to a value of $\gamma_{HND_3} = 0.80$ to 0.50 at molar ratios of nitric acid:-dinitroanthraquinone of 10:1 to 80:1 and is isolated in the customary manner, or that 1,5- and 1,8-dinitroanthraquinone are precipitated together from the dinitroanthraquinone mixture by adjusting the molar fraction of nitric acid to a value of $\gamma_{HNO_3} = 0.80$ to 0.50 at molar ratios of nitric acid:dinitroanthraquinones of 10:1 to 80:1, and are isolated in the usual manner.

The nitration of anthraquinone, 1-nitroanthraquinone and/or mixtures which contain these components, to dinitroanthraquinones is appropriately carried out at molar ratios of nitric acid to nitratable products $\geq 12:1$, since at lower molar ratios complete conversion to dinitroanthraquinones can only be achieved with difficulty, even at higher temperatures (65°C).

Whilst at molar ratios of 20:1 to 15:1 15 to 20 hours are required to complete the reaction at 35°C, the reaction is already complete after approx. 2.5 to 4 hours at 65°C. If, for example, nitration is carried out at molar ratios of 80:1 to 40:1, the reaction times at 65°C are 5 or 20 minutes respectively and at 55°C 10 or 40 minutes respectively. Similarly short reaction times are achieved if nitration is carried out at lower temperatures and higher molar ratios. However, this procedure is uneconomical since the nitric acid which requires to be worked up after the nitration is obtained in larger quantities.

Since the reaction to give the dinitroanthraquinones can already be carried out after relatively short reaction times, the reaction can also be carried out continuously.

The isolation of the 1,5-dinitroanthraquinone or 1,8-dinitroanthraquinone fraction from the reaction mixture in each case gives an 80 – 95 percent pure 1,5- or 1,8-dinitroanthraquinone which in each case still contains 3 – 19 percent of the other components but is practically free of 1,6- and 1,7-dinitroanthraquinone. The values to which the molar fractions must be adjusted in order to isolate such (dinitroanthraquinone) fractions depend on the molar ratio of nitric acid to dinitroanthraquinones and on the temperature. Thus, for example, to isolate 80 percent pure 1,5- or 1,8-dinitroanthraquinone it is necessary, at molar ratios of nitric acid:dinitroanthraquinones of 17:1, 38:1 and 78:1, and at room temperature, to adjust the molar fractions to values of 0.83 or 0.69 respectively, 0.87 or 0.55 respectively and 0.74 or 0.50 respectively.

If, for example, the nitration is carried out in such a way that after the nitration the molar ratio of nitric acid: dinitroanthraquinones is, for example, 10:1, and the molar fraction is 0.75, the precipitate, free of 1,6-/1,7-dinitroanthraquinone, which is finally obtained at room temperature contains an almost equal proportion of the 1,5- and 1,8- component. These mixtures can be separated by modifying the molar fraction and molar ratio, by addition of dilute nitric acid, in such a way that the 1,8-dinitroanthraquinone very largely redissolves.

Of course, the value to which the molar fraction must be adjusted in order to isolate the dinitroanthraquinones also depends on the temperature. If the isolation is carried out at higher or lower temperatures than room temperature it is necessary to select molar fractions which lie respectively in the lower or upper part of the indicated molar fraction ranges. In general, the separation is carried out at room temperature.

The isolation of the individual fractions can be carried out, for example, in the form of the following variants.

Variant 1:

After the nitration - above all, if the nitration is carried out at molar ratios of nitric acid:nitratable product >20:1 - sufficient concentrated nitric acid is distilled off that 1,5-dinitroanthraquinone precipitates. After separating off the solid product, concentrated nitric acid is again distilled from the filtrate until the 1,8-dinitroanthraquinone has precipitated. After it has been separated off, the products which are still dissolved can be precipitated from the filtrate either by dilution with water or by further distilling off nitric acid.

Variant 2:

1,5-Dinitroanthraquinone is first precipitated by adding water to the reaction mixture and filtered off, and thereafter 1,8-dinitroanthraquinone is precipitated by further dilution of the filtrate with water, and is isolated. The filtrate is worked up in accordance with Variant 1.

Variant 3:

If nitration is carried out at molar ratios of nitric acid:nitratable products of <<20:1, a mixture of 1,5- and 1,8-dinitroanthraquinone precipitates at room temperature which contains the individual components in approximately equal proportions. A separation can be achieved if thereafter the 1,8-dinitroanthraquinone is redissolved by means of dilute nitric acid, the 1,5-dinitroanthraquinone is filtered off and the 1,8-dinitroanthraquinone is reprecipitated from the filtrate by following the procedure according to Variant 1 or 2. Of course, the 1,8-dinitroanthraquinone can also be redissolved by adding concentrated nitric acid. If nitration is carried out at molar ratios >>20:1, sufficient concentrated nitric acid can be distilled off to precipitate the entire 1,5- and 1,8-dinitroanthraquinone. Nitric acid is then added until the 1,8-dinitroanthraquinone has dissolved and the mixture is worked up further according to Variant 1 or 2.

Of course, combinations of these variants are also possible.

The 1,5- and 1,8-dinitroanthraquinones obtained according to the process of the invention are used as dyestuff intermediates. Thus, for example, 1,5-dinitroanthraquinone prepared according to this process and still containing 3 – 12 percent of 1,8-dinitroanthraquinone can be converted by reduction according to known procedure into the 1,5-diaminoanthraquinone of corresponding composition. The resulting quality makes it possible to prepare dyestuffs from the product, without additional purification, by known methods and in good yield.

Advantages of the process according to the invention are essentially that the nitration to the dinitroanthraquinone stage can be carried out in short times and hence by a continuous procedure and that the dinitroanthraquinone mixture can be separated direct, working from the nitration medium, without first having to isolate the dinitroanthraquinone mixture from the reaction mixture. Here it is of particular advantage that the nitration medium as such remains preserved and can be recycled to the process by working it up by distillation and if necessary re-concentrating it.

Example 1

208 g of anthraquinone are stirred with 2,540 g of 99 percent strength nitric acid (molar ratio of nitric acid to anthraquinone 40:1) for 1.75 hours at 35°. Approx. 165 g of water are then added (molar fraction approx. 0.74), the 1,5-dinitroanthraquinone (a) which has precipitated is filtered off, the filtrate is diluted with a further 244 g of water (molar fraction 0.59) and the 1,8-dinitroanthraquinone (b) which has precipitated is filtered off. The products still dissolved in the filtrate are precipitated by evaporating off the nitric acid.
   a. Yield: 111 g (36 percent of theory), 82.3% of 1,5-dinitroanthraquinone and 15.0 percent of 1,8-dinitroanthraquinone.
   b. Yield: 105 g (35 percent of theory), 19.2 percent of 1,5-dinitroanthraquinone and 79 percent of 1,8-dinitroanthraquinone.

Example 2

208 g of anthraquinone and 3,180 g of 99 percent strength nitric acid (molar ratio of nitric acid to anthraquinone 50:1) are stirred for 25 hours at 0°. 1,970 g of 99 percent strength nitric acid are then slowly distilled from the reaction mixture through a column (molar fraction 0.83). The 1,5-dinitroanthraquinone which has precipitated is filtered off. The 1,8-dinitroanthraquinone (b) is precipitated from the filtrate by addition of 82 g of water (molar fraction 0.69) and is filtered off.
   a. Yield: 108 g (35 percent of theory), 83.0 percent of 1,5-dinitroanthraquinone and 15.1 percent of 1,8-dinitroanthraquinone.
   b. Yield: 107 g (36 percent of theory), 20.6 percent of 1,5-dinitroanthraquinone and 78.7 percent of 1,8-dinitroanthraquinone.

Example 3

208 g of anthraquinone and 1,212 g of 99 percent strength nitric acid (molar ratio of nitric acid to anthraquinone 19:1) are warmed for 4 hours at 55°. The 1,5-dinitroanthraquinone fraction (a) which has precipitated is separated off at 0° (molar fraction 0.83) and the filtrate is slowly diluted with 85 g of water (molar fraction 0.67). The 1,8-dinitroanthraquinone (b) which has precipitated is then filtered off.
   a. Yield: 105 g (34 percent of theory), 81.0 percent of 1,5-dinitroanthraquinone and 16.0 percent of 1,8-dinitroanthraquinone.
   b. Yield: 111 g (37 percent of theory), 23.8 percent of 1,5-dinitroanthraquinone and 75.5 percent of 1,8-dinitroanthraquinone.

Example 4

100 g of a mixture consisting of 66 percent of 1-nitroanthraquinone, 1 percent of 2-nitroanthraquinone, 2.5 percent of anthraquinone, 10.5 percent of 1,8-dinitroanthraquinone, 17.8 percent of 1,5-dinitroanthraquinone and 2.6 percent of 1,6-/1,7-dinitroanthraquinone are stirred with 428 g of 99 percent strength nitric acid (molar ratio of nitric acid to nitratable products 23.5:1) for 3.0 hours at 60°. The 1,5-dinitroanthraquinone fraction (a) which has precipitated (molar fraction 0.87) is filtered off at 40°. The 1,8-dinitroanthraquinone fraction (b) is precipitated by adding 111 g of 20 percent strength nitric acid to the filtrate (molar fraction 0.56) and is subsequently separated off at room temperature.
   a. Yield: 57.8 g (50 percent of theory), 82 percent of 1,5-dinitroanthraquinone and 14.9 percent of 1,8-dinitroanthraquinone.
   b. Yield: 35.0 g (31 percent of theory), 14.5 percent of 1,5-dinitroanthraquinone and 84.5 percent of 1,8-dinitroanthraquinone.

Example 5

208 g of anthraquinone and 3,182 g of 99 percent strength nitric acid (molar ratio of nitric acid to anthraquinone 50:1) are heated to 65° for 20 minutes. 1,970 g of 99 percent strength nitric acid are then distilled off through a column (molar fraction 0.83). After separating off the 1,5-dinitroanthraquinone fraction (a) the 1,8-dinitroanthraquinone (b) is precipitated from the filtrate by distilling off 445 g of 99 percent strength nitric acid through a column (molar fraction 0.78).
   a. Yield: 96.2 g (31 percent of theory), 84.7 percent of 1,5-dinitroanthraquinone and 12.0 percent of 1,8-dinitroanthraquinone.
   b. Yield: 119.0 g (39 percent of theory), 25.1 percent of 1,5-dinitroanthraquinone and 74.1 percent of 1,8-dinitroanthraquinone.

Example 6

208 g of anthraquinone and 827 g of 99 percent strength nitric acid (molar ratio of nitric acid to anthraquinone 13:1) are heated under reflux at 75° for 18 hours (molar fraction 0.76). After cooling to room temperature, the product which has precipitated is filtered off.
   Yield: 219.0 g (73 percent of theory), 52.0 percent of 1,5-dinitroanthraquinone and 42.2 percent of 1,8-dinitroanthraquinone.

Example 7

100 g of a nitration mixture consisting of 25.6 percent of 1-nitroanthraquinone, 40 percent of 2-nitroanthraquinone, 11.2 percent of anthraquinone, 10.5 percent of 1,8-dinitroanthraquinone, 1.9 percent of 1,5-dinitroanthraquinone and 10.7 percent of 1,6-/1,7-dinitroanthraquinone are stirred with 405 g of 99 percent strength nitric acid (molar ratio of nitric acid to nitratable products 19:1) for 2.5 hours at 65° (molar fraction 0.85). The mixture is then cooled to 0° and the 1,5-dinitroanthraquinone (a) which has precipitated is filtered off. The filtrate is then diluted with 41 g of water (molar fraction 0.66) and the product (b) which has precipitated is separated off.
  a. Yield: 37.4 g, 79.1 percent of 1,5-dinitroanthraquinone and 18 percent of 1,8-dinitroanthraquinone.
  b. Yield: 16.5 g, 5.4 percent of 1,5-dinitroanthraquinone and 91.0 percent of 1,8-dinitroanthraquinone.

Example 8

253 g of 1-nitroanthraquinone and 3,819 g of 99 percent strength nitric acid (molar ratio of nitric acid to 1-nitroanthraquinone 60:1) are heated to 65° for 10 minutes. 1,272 g of 99 percent strength nitric acid are then distilled off through a column. After adding 47 g of water to the sump (molar fraction 0.87) the 1,5-dinitroanthraquinone fraction (a) which has precipitated is filtered off and the 1,8-dinitroanthraquinone (b) is precipitated from the filtrate by further addition of 470 g of water (molar fraction 0.55), and is separated off.
  a. Yield: 73 g (24 percent of theory), 91.1 percent of 1,5-dinitroanthraquinone and 7.5 percent of 1,8-dinitroanthraquinone.
  b. Yield: 162 g (54 percent of theory), 32.7 percent of 1,5-dinitroanthraquinone and 66.2 percent of 1,8-dinitroanthraquinone.

Example 9

A mixture of 208 g of anthraquinone and 5,090 g of 99 percent strength nitric acid (molar ratio of nitric acid to anthraquinone 80:1) is heated to 55° for 5 minutes. 3,188 g of nitric acid (99 percent strength) are then distilled off through a column (molar fraction 0.84), the product (a) which has precipitated is separated off at 15° and the 1,8-dinitroanthraquinone fraction (b) is precipitated from the filtrate by addition of 154 g of water (molar fraction 0.61), and separated off.
  a. Yield: 123 g (40% of theory) of 79.2 percent of 1,5-dinitroanthraquinone and 18.3 percent of 1,8-dinitroanthraquinone.
  b. Yield: 104 g (35 percent of theory), 17.1 percent of 1,5-dinitroanthraquinone and 82.2 percent of 1,8-dinitroanthraqinone.

Example 10

100 g of a mixture consisting of 66 percent of 1-nitroanthraqinone, 1 percent of 2-nitroanthraquinone, 2.5 percent of anthraquinone, 10.5 percent of 1,8-dinitroanthraquinone, 17.8 percent of 1,5-dinitroanthraquinone and 2.6 percent of 1,6-/1,7-dinitroanthraquinone are stirred with 700 g of 99 percent strength nitric acid (molar ratio of nitric acid to nitratable products 40:1) for 20 minutes at 65°. The 1,5-dinitroanthraquinone fraction (a) is precipitated by evaporation of 556 g of 99 percent strength nitric acid from the reaction mixture and subsequent addition of 1,628 g of dilute nitric acid (89 percent strength) (molar fraction 0.70) and is separated off. The 1,8-dinitroanthraquinone (b) is precipitated from the filtrate by addition of 210 g of water (molar fraction 0.53), and separated off.
  a. Yield: 39.6 g, 88.0 percent of 1,5-dinitroanthraquinone and 10.3 percent of 1,8-dinitroanthraquinone.
  b. Yield: 57.8 g, 32.1 percent of 1,5-dinitroanthraquinone and 67.2 percent of 1,8-dinitroanthraquinone.

Example 11

208 g of anthraquinone and 955 g of 99 percent strength nitric acid (molar ratio of nitric acid to anthraquinone 15:1) are heated to 35° for 14 hours. 4,615 g of 91.0 percent strength nitric acid are added to the warm mixture (molar fraction 0.76). The 1,5-dinitroanthraquinone fraction (a) which is precipitated is separated off at room temperature whilst the 1,8-dinitroanthraquinone (b) is precipitated from the filtrate by distilling off 3,050 g of 99 percent strength nitric acid (molar fraction 0.57) and is subsequently separated off.
  a. Yield: 79 g (29 percent of theory), 91.2 percent of 1,5-dinitroanthraquinone, 7.9 percent of 1,8-dinitroanthraquinone.
  b. Yield: 145 g (48 percent of theory), 29.6 percent of 1,5-dinitroanthraquinone and 70.1 percent of 1,8-dinitroanthraquinone.

Example 12

208 g of anthraquinone and 2,650 g of 95 percent strength nitric acid (molar ratio of nitric acid and to anthraquinone 40:1) are heated to 55° for 9 hours. The product is precipitated from the reaction mixture by distilling off 1,273 g of 99 percent strength nitric acid (molar fraction 0.64).
Yield: 218 g (71 percent of theory), 51.3 percent of 1,5-dinitroanthraquinone and 45.7 percent of 1,8-dinitroanthraquinone.

Example 13

A mixture of 208 g of anthraquinone and 1,290 g of 97.5 percent strength nitric acid (molar ratio of nitric acid to anthraquinone 20:1) is stirred for 14 hours at 55°. After addition of 1,418 g of dilute nitric acid (89 percent strength) (molar fraction 0.74), the 1,5-dinitroanthraquinone fraction (a) is separated off at room temperature and the 1,8-dinitroanthraquinone (b) is precipitated by distilling 1,260 g of 99 percent strength nitric acid from the filtrate (molar fraction 0.60), and is filtered off.
  a. Yield: 99 g (32 percent of theory), 86.9 percent of 1,5-dinitroanthraquinone and 10.5 percent of 1,8-dinitroanthraquinone.
  b. Yield: 139 g (46 percent of theory), 21.6 percent of 1,5-dinitroanthraquinone and 77.2 percent of 1,8-dinitroanthraquinone.

Example 14

208 g of anthraquinone and 5,090 g of 99 percent strength $HNO_3$ (molar ratio of nitric acid to anthraquinone 80:1) are stirred for 2 hours at 25°. Thereafter, 343 g of water are added to the reaction mixture (molar fraction 0.76), the 1,5-dinitroanthraquinone fraction (a) is separated off and the 1,8-dinitroanthraquinone fraction (b) is precipitated by adding 880 g of water (molar fraction 0.52) and separated off.

a. Yield: 70.4 g (23 percent of theory), 92.2 percent of 1,5-dinitroanthraquinone, 6.9 percent of 1,8-dinitroanthraquinone.

b. Yield: 146 g (49 percent of theory) 32.3 percent of 1,5-dinitroanthraquinone and 67.2 percent of 1,8-dinitroanthraquinone.

We claim:

1. Process for the preparation of 1,5- and/or 1,8-dinitroanthraquinone which is practically free of 1,6- and 1,7-dinitroanthraquinone, characterised in that anthraquinone and/or 1-nitroanthraquinone or anthraquinone nitration mixtures which contain anthraquinone and/or 1-nitroanthraquinone are nitrated in nitric acid having a concentration of 90% or more at a molar ratio of nitric acid to the said anthraquinones of at least 12:1 from 0°C to the boiling point of the nitric acid to give dinitroanthraquinone and thereafter 1,5-dinitroanthraquinone is directly precipitated from the reaction mixture by adjusting the molar fraction of nitric acid to a value of $\gamma_{HNO_3} = 0.90$ to 0.68 at molar ratios of nitric acid:dinitroanthraquinone of 10:1 to 80:1 and is isolated in the usual manner, 1,8-dinitroanthraquinone is then precipitated from the filtrate by adjusting the molar fraction of nitric acid to a value of $\gamma_{HNO_3} = 0.80$ to 0.50 at molar ratios of nitric acid:dissolved dinitroanthraquinones of 10:1 to 80:1 and is isolated in the usual manner, or 1,5- and 1,8-dinitroanthraquinone are precipitated together directly after the nitration by adjusting the molar fraction of nitric acid to a value of $\gamma_{HNO_3} = 0.80$ to 0.50 at molar ratios of nitric acid:dinitroanthraquinones of 10:1 to 80:1 and are isolated in the usual manner.

2. Process according to claim 1, characterised in that nitration is carried out in nitric acid of at least 92% strength.

3. Process according to claim 1, characterised in that nitration is carried out at a molar ratio of nitric acid:nitratable products from 20:1 to 80:1.

4. Process according to claim 1, characterised in that the molar fraction of nitric acid is adjusted by distilling off nitric acid.

5. Process according to claim 1, characterised in that the molar fraction of nitric acid is adjusted by adding water.

6. Process according to claim 1, characterised in that the molar fraction of nitric acid is adjusted by adding dilute nitric acid.

7. Process according to claim 1, characterised in that the molar fraction of nitric acid is adjusted by distilling off nitric acid and/or adding water and/or dilute nitric acid, in optional sequence.

8. Process for isolating 1,5- and/or 1,8-dinitroanthraquinone from dinitroanthraquinone mixtures which consist essentially of 1,5-, 1,8-, 1,6- and 1,7-dinitroanthraquinone, characterised in that the dinitroanthraquinone mixtures are first treated with nitric acid at a molar ratio of nitric acid to dinitroanthraquinone of about 10:1 to 80:1 and at a molar fraction of nitric acid of $\gamma_{HNO_3} = 0.90$ to 0.68, the undissolved 1,5-dinitroanthraquinone is separated off and isolated in the usual manner and thereafter 1,8-dinitroanthraquinone is precipitated from the filtrate by adjusting the molar fraction of nitric acid to a value of $\gamma_{HNO_3}$ 0.80 to 0.50 at molar ratios of nitric acid:dinitroanthraquinones of 10:1 to 80:1 and is isolated in the usual manner, or that 1,5- and 1,8-dinitroanthraquinone are together separated from the dinitroanthraquinone mixture by adjusting the molar fraction of nitric acid to a value of $\gamma_{HNO_3} = 0.80$ to 0.50 at molar ratios of nitric acid:dinitroanthraquinones of 10:1 to 80:1 and are isolated in the usual manner.

* * * * *